May 12, 1931.  W. J. PASINSKI ET AL  1,805,225
CALCULATING MACHINE
Filed Feb. 29, 1928    11 Sheets-Sheet 1
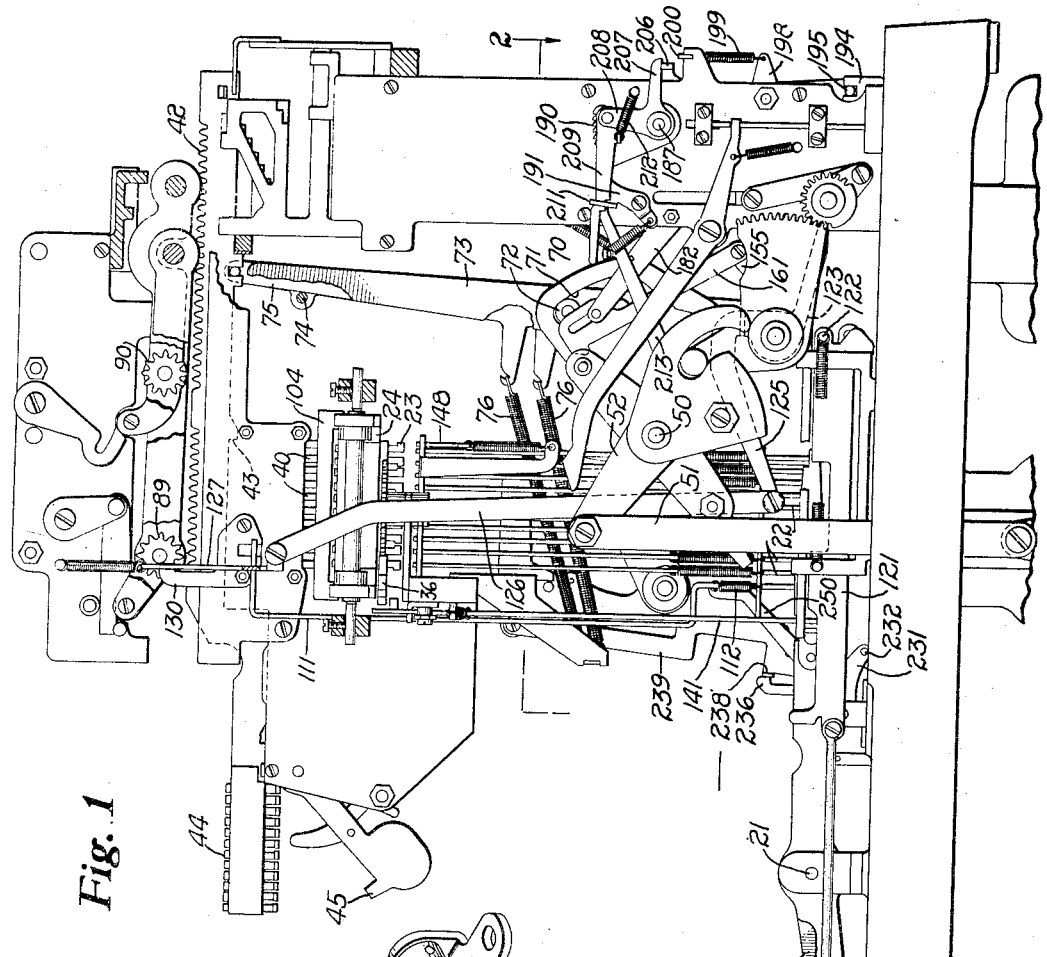
Fig. 1
Fig. 16
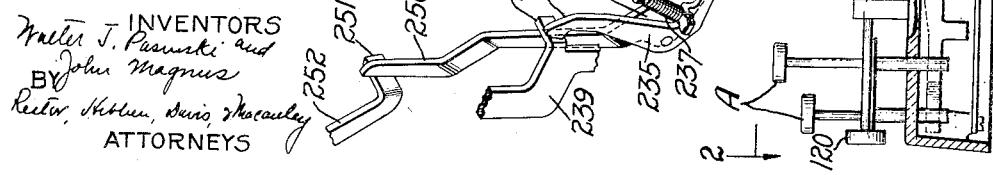
INVENTORS
Walter J. Pasinski and
John Magnus
BY
Rector, Hibben, Davis & Macauley
ATTORNEYS May 12, 1931.  W. J. PASINSKI ET AL  1,805,225
CALCULATING MACHINE
Filed Feb. 29, 1928     11 Sheets-Sheet 2

INVENTORS
Walter J. Pasinski
John Magnus
BY Rector, Hibben, Davis, & Macauley
ATTORNEYS May 12, 1931. W. J. PASINSKI ET AL 1,805,225
CALCULATING MACHINE
Filed Feb. 29, 1928 11 Sheets-Sheet 4
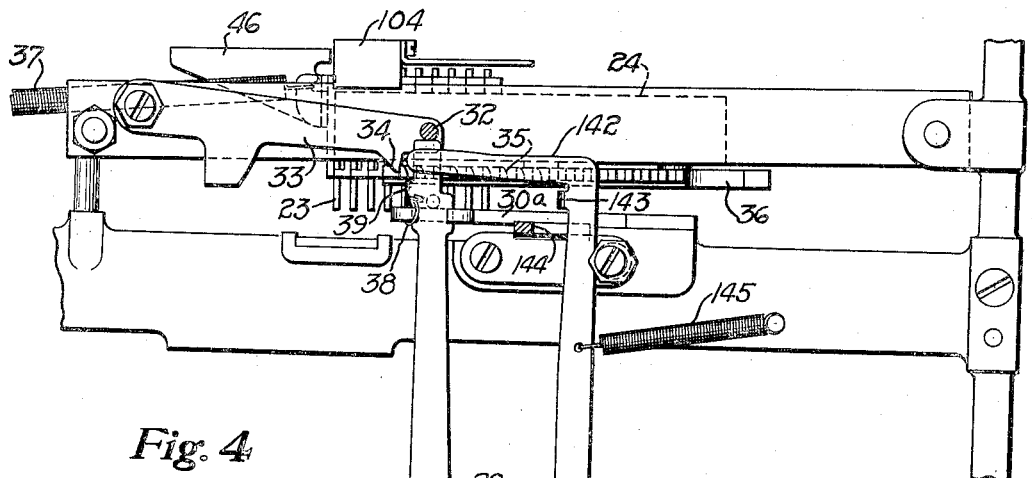
Fig. 4
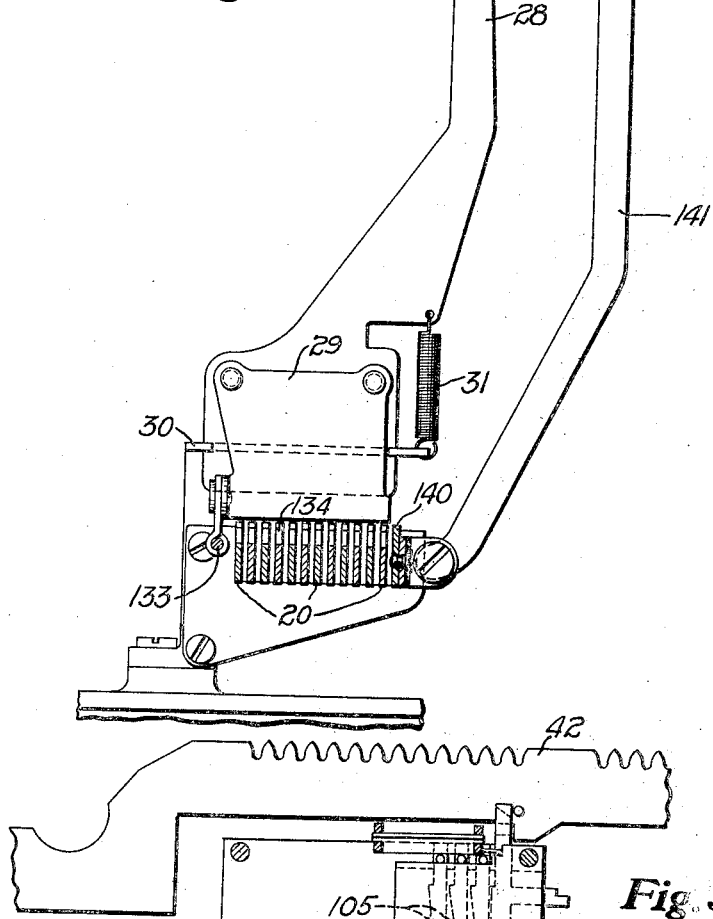
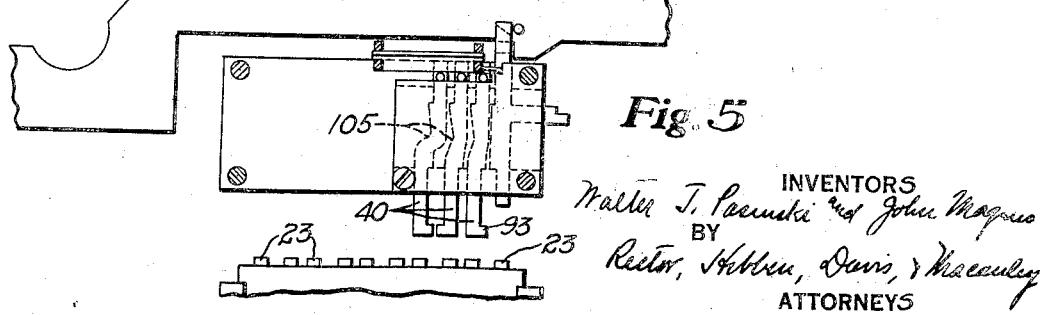
Fig. 5
INVENTORS
Walter J. Pasinski and John Magnus
BY
Rector, Hibben, Davis, & Macauley
ATTORNEYS Fig. 6
Fig. 7
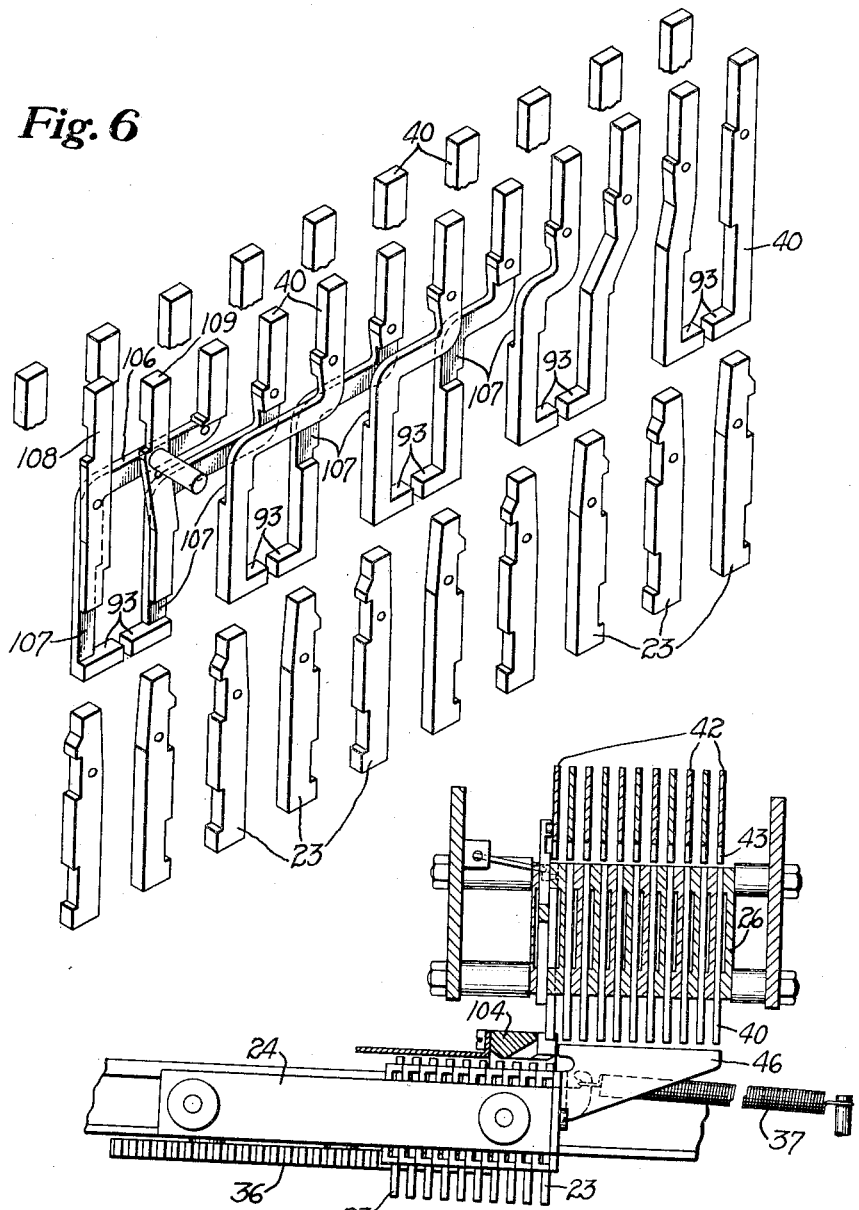
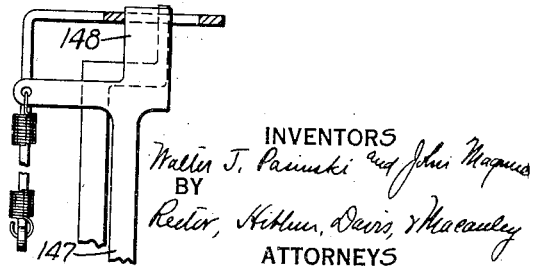
INVENTORS
Walter J. Pasinski and John Magnus
BY
Rector, Hibben, Davis, & Macauley
ATTORNEYS

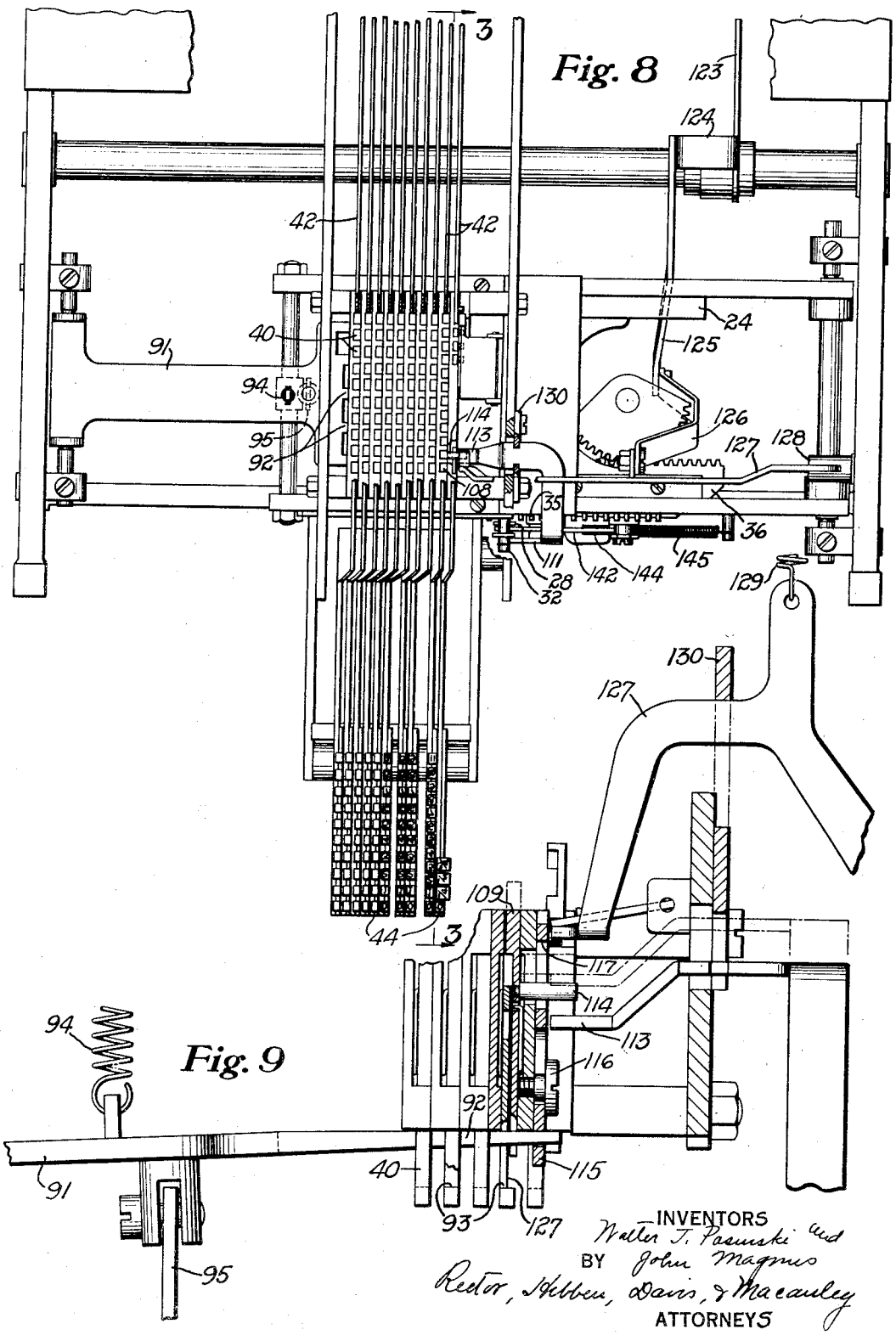

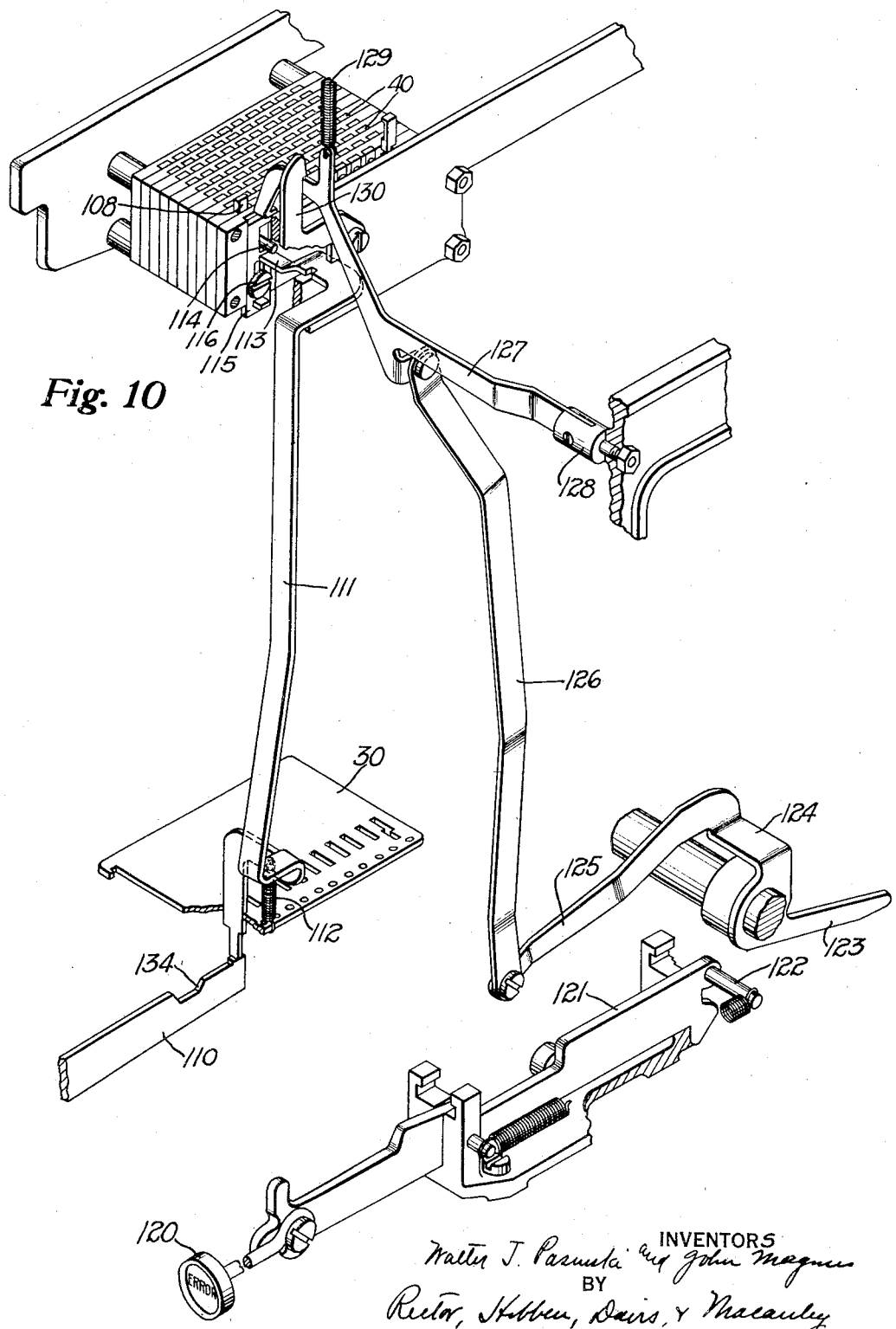

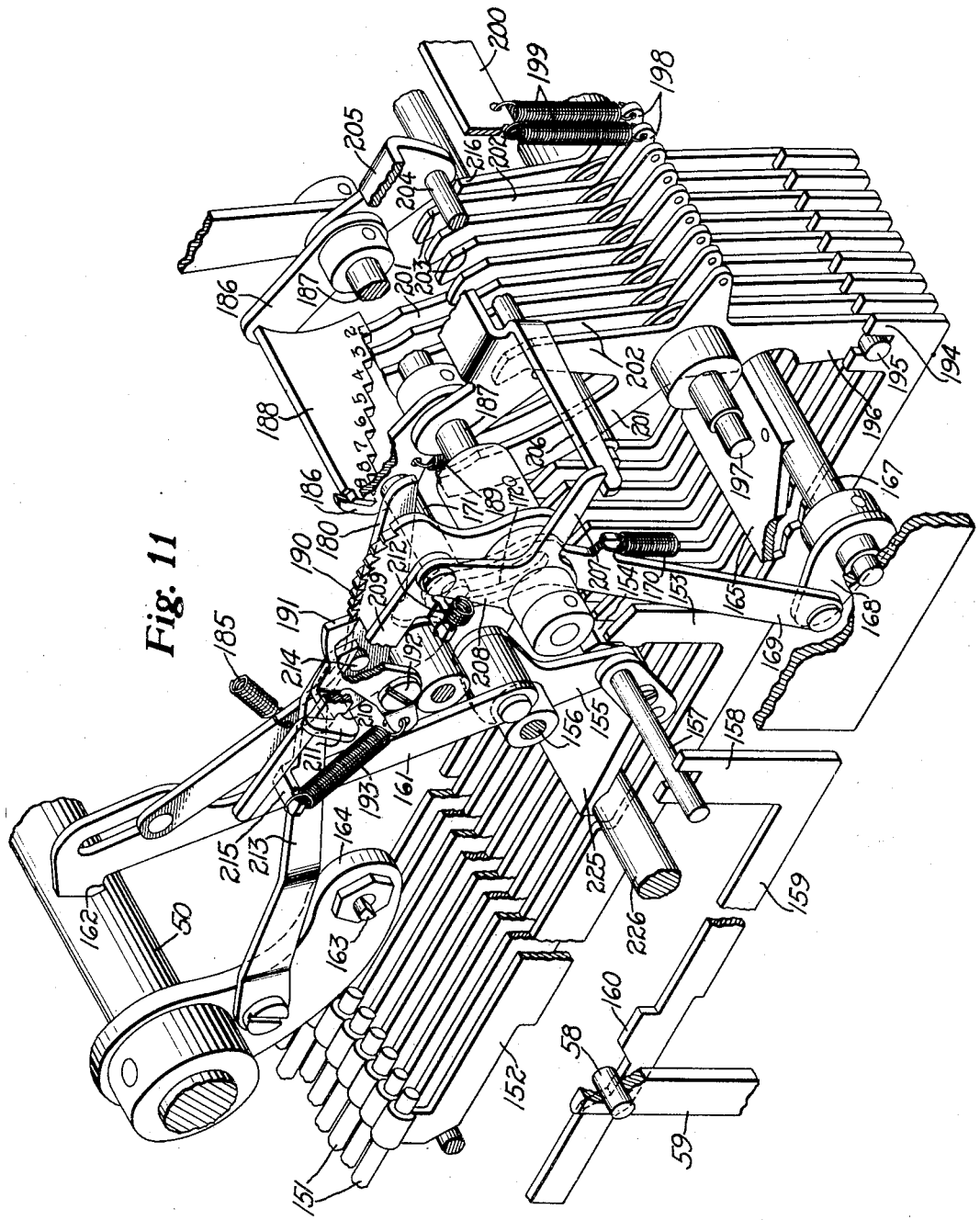

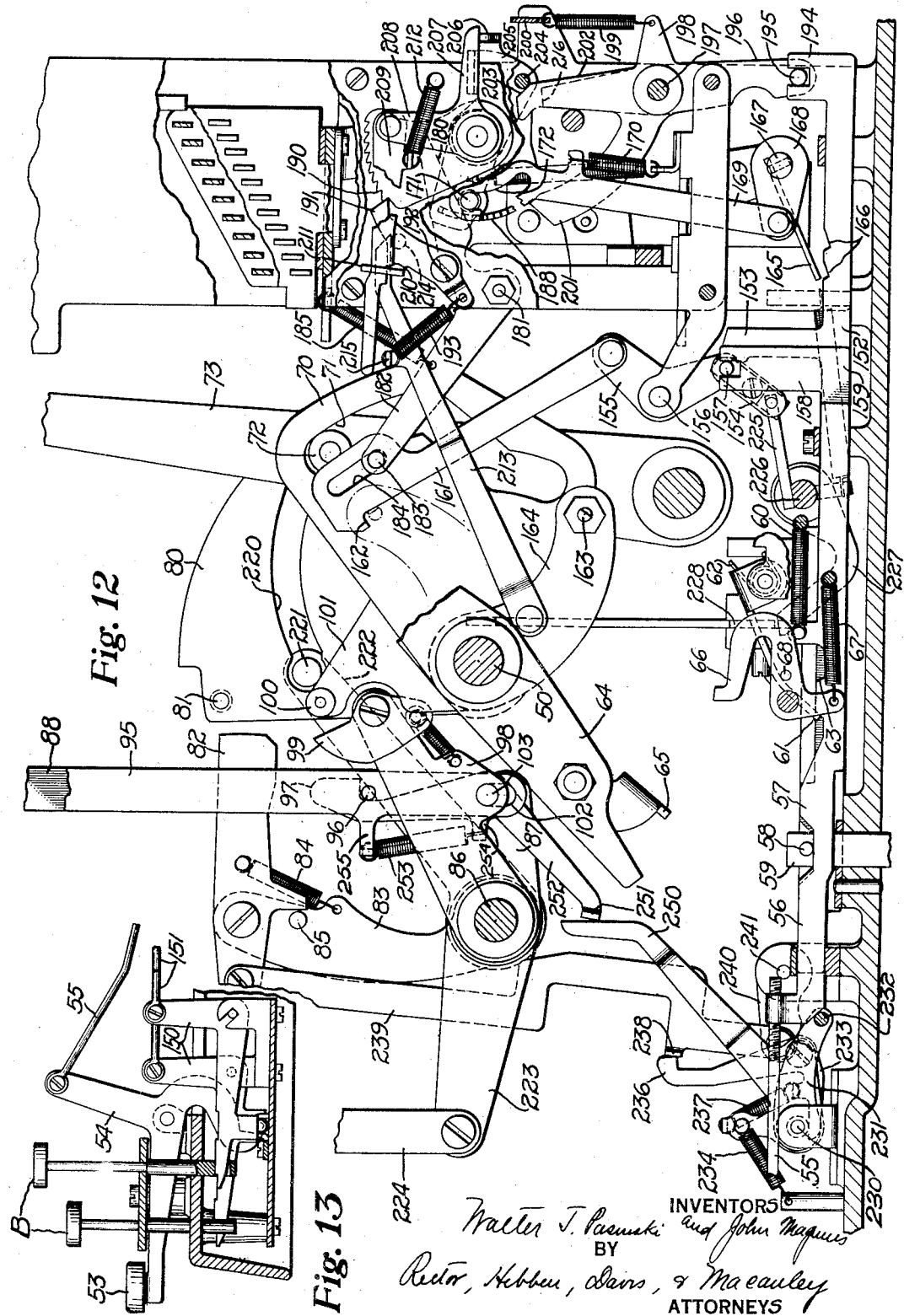

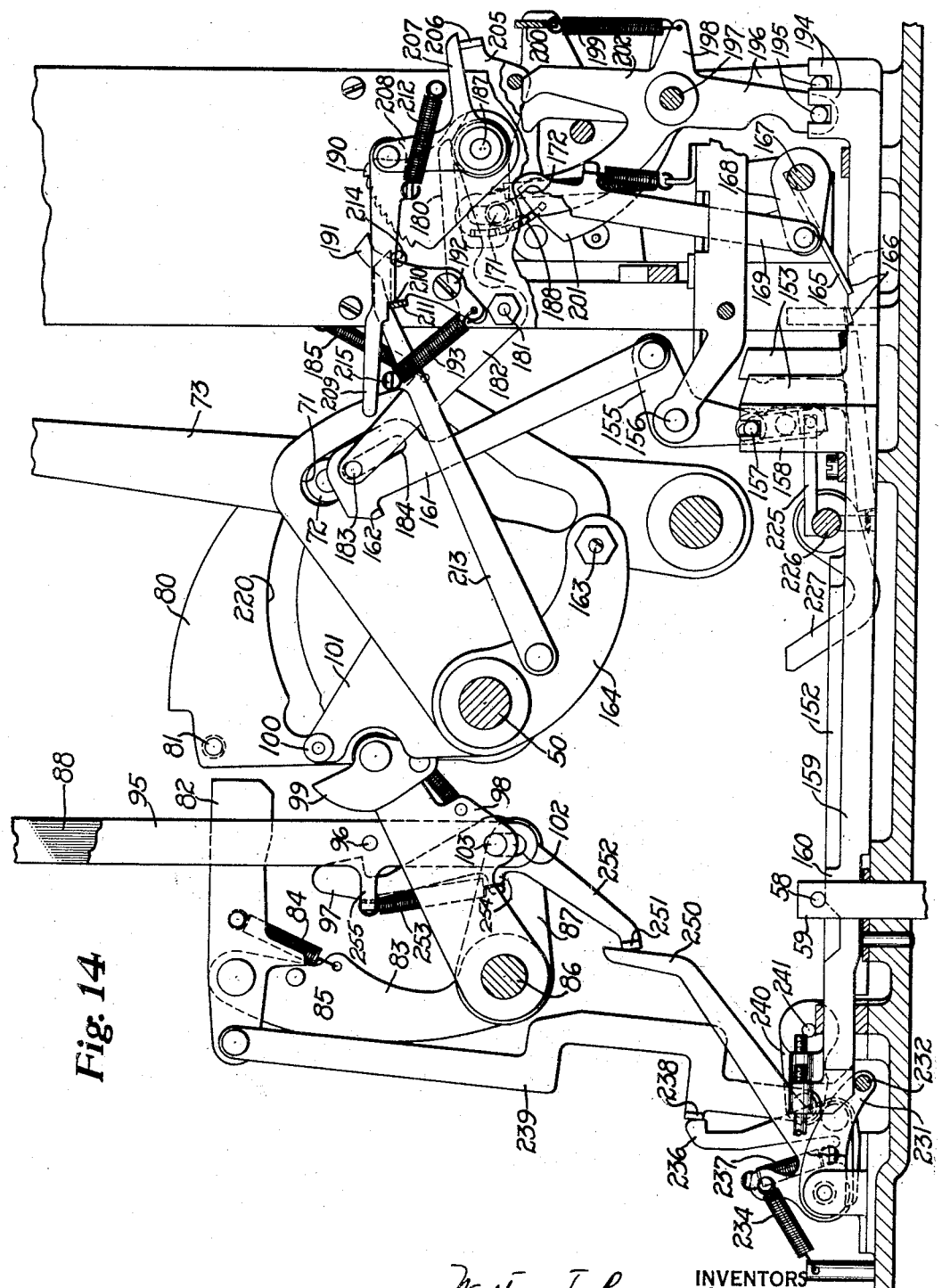

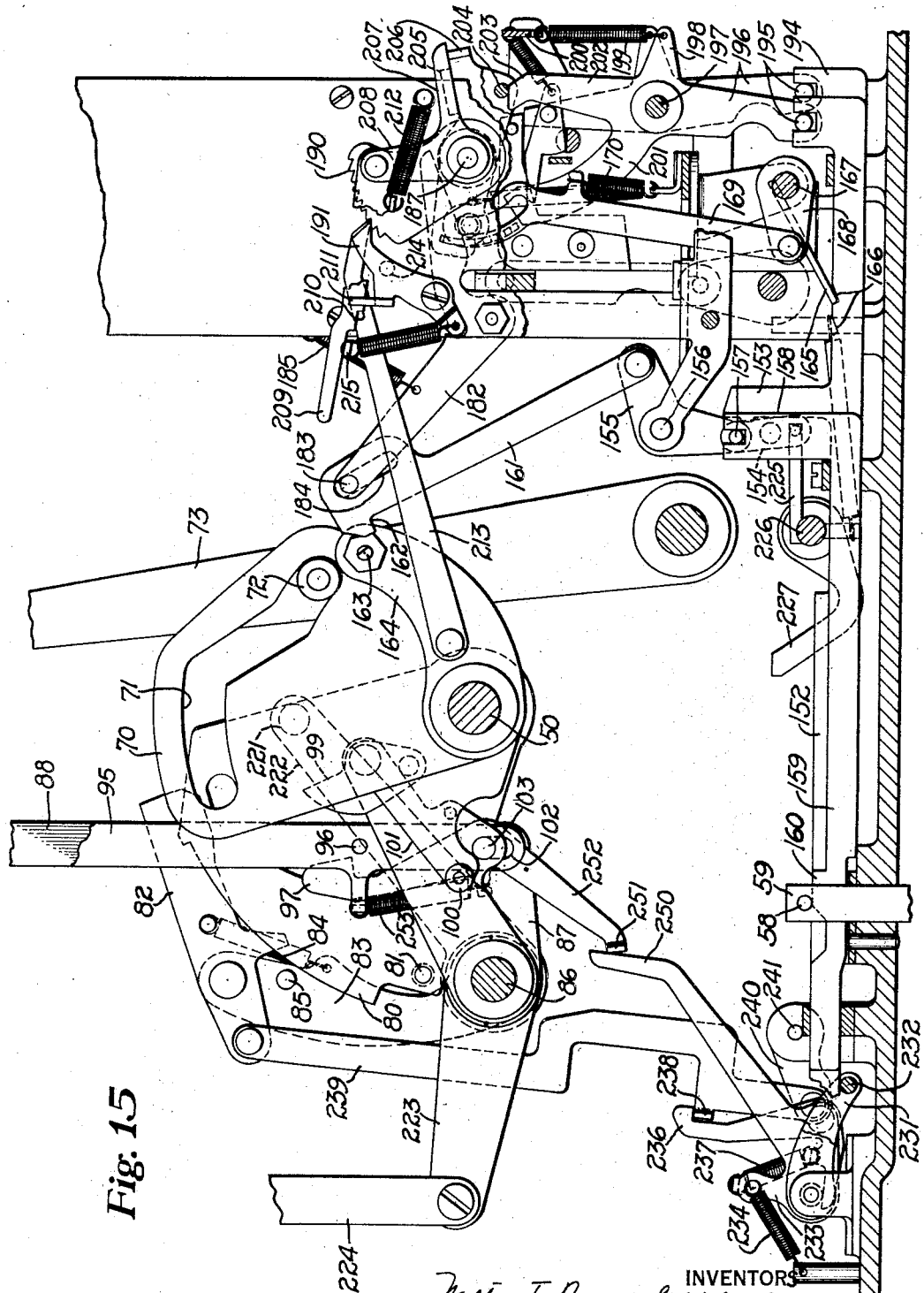

Patented May 12, 1931

1,805,225

UNITED STATES PATENT OFFICE

WALTER J. PASINSKI AND JOHN MAGNUS, OF DETROIT, MICHIGAN, ASSIGNORS TO BURROUGHS ADDING MACHINE COMPANY, OF DETROIT, MICHIGAN, A CORPORATION OF MICHIGAN

CALCULATING MACHINE

Application filed February 29, 1928. Serial No. 257,850.

This invention relates to a calculating machine, particularly to a machine of the ten key type having a traveling pin carriage such, for example, as illustrated in the Hopkins Patent 1,336,904. The invention comprehends a machine of this character capable of operating with monetary systems which are not based entirely on the decimal system such, for example, as the English sterling currency system. It also comprehends the provision of a machine of this character that is capable of multiplication as well as addition and subtraction.

The decimal system lends itself well to calculating machine construction because each unit is one-tenth of the value of the unit of next higher order. Where there is a shifting of some of the parts relative to others, as in a ten key machine with a traveling pin carriage, no difficulty is encountered in having the parts cooperate properly because every order has ten units.

When an effort is made to adapt these machines for use with currency systems other than the decimal system, complications immediately develop. In many cases the change necessary is such that it amounts to building an entirely new and special machine. This is necessarily costly. The decimal machines are made economically because the production facilities are standardized for quantity production, while machines for other systems of calculation must be made by special tools and generally they are produced in only small quantities. The present invention is directed to a solution of this problem and it has for one of its objects the provision of a calculating machine that will operate with currency systems other than the decimal system such, for example, as the English sterling currency system, and, at the same time, closely resemble the usual form of decimal machine so that very few new parts will be required.

Certain calculating machines such, for example, as the machine illustrated in the Hopkins patent referred to, are provided with mechanism for performing multiplication and division. This mechanism must also be changed in the event the machine is to be used with currency systems other than the decimal system. In order to avoid changes in this mechanism and at the same time make the machine capable of multiplication and division, a mechanism is provided for enabling these operations to be performed by a process of repeated addition or repeated subtraction. The mechanism for accomplishing this result will be referred to generally as the multiplying mechanism, although it should be understood that said mechanism is also capable of division when the machine is conditioned for subtraction.

The general object of the invention is, therefore, to provide an improved calculating machine adapted for use with currency systems other than the decimal system, such, for example, as the English sterling currency system.

A more particular object is to provide an improved calculating machine of the ten key type capable of use with currency systems such as the English sterling system, the major portion of which shall embody the same parts as the same type of machine used for decimal systems of calculation.

A still more particular object is to construct a machine of the type illustrated in Hopkins Patent 1,336,904 so that it will operate with an English sterling currency system with a minimum number of changes over the construction used with the decimal system.

Another object is to provide an improved multiplying mechanism for use with calculating machines.

A further object is to provide an improved multiplying mechanism for use with a machine of the type disclosed in said Hopkins patent.

Other objects and advantages of the invention will appear from the specification and drawings.

An embodiment of the invention is shown in the accompanying drawings in which;

Figure 1 is a fore-shortened side elevation of the machine showing the parts in normal condition, some of the parts being broken away and others being omitted to avoid confusion;

Fig. 4 is an enlarged partial front elevation showing particularly the escapement mechanism for tabulating the traveling pin carriage;

Fig. 5 is a detailed side elevation illustrating particularly the farthing stop pins in the stationary field of stops;

Fig. 6 is the separated perspective in the nature of a diagrammatic view illustrating particularly the spacing of the stops in one of the rows of the stationary field of stops and showing also the cooperative relation of these stops with the pin stops in the traveling field of stops;

Fig. 7 is a detailed section looking from the rear of the machine and illustrating the zero stop mechanism;

Fig. 8 is a partial plan view taken immediately above the actuator rack bars;

Fig. 9 is a fragmentary vertical section taken through the "10" stop in the pence order in the stationary field of stops, said view showing the means for restoring the stop pins and the special control features for the "10" stop;

Fig. 10 is a perspective view of the controls for the "10" stop of the pence order in the stationary field of stops;

Fig. 11 is a fragmentary perspective view of the multiple stroke mechanism;

Fig. 12 is an enlarged right side elevation of the rear portion of the machine showing the parts in normal condition, the housing being broken away to illustrate some of the parts more clearly;

Fig. 13 is a detailed side elevation and section of the front portion of the machine illustrating particularly the connections operated by the various keys of the keyboard;

Fig. 14 is a view similar to Fig. 12 illustrating the parts in the position they occupy when a multiplier key has been depressed and the multiple stroke mechanism has been set to stroke-determining position;

Fig. 15 is also a view similar to Fig. 12 showing the parts in the position they occupy at the end of the first half stroke of the machine in a multiplying operation.

Fig. 16 is a detail perspective view of certain of the controls used in multiplying.

The invention has been illustrated in connection with a Burroughs-Hopkins machine of the type described in Hopkins Patent No. 1,336,904. The general construction of this machine will be briefly explained in order that the invention may be easily comprehended, but all of its features will not be described, reference being made to said patent for such details as are not explained herein.

*General construction*

Figure 2:
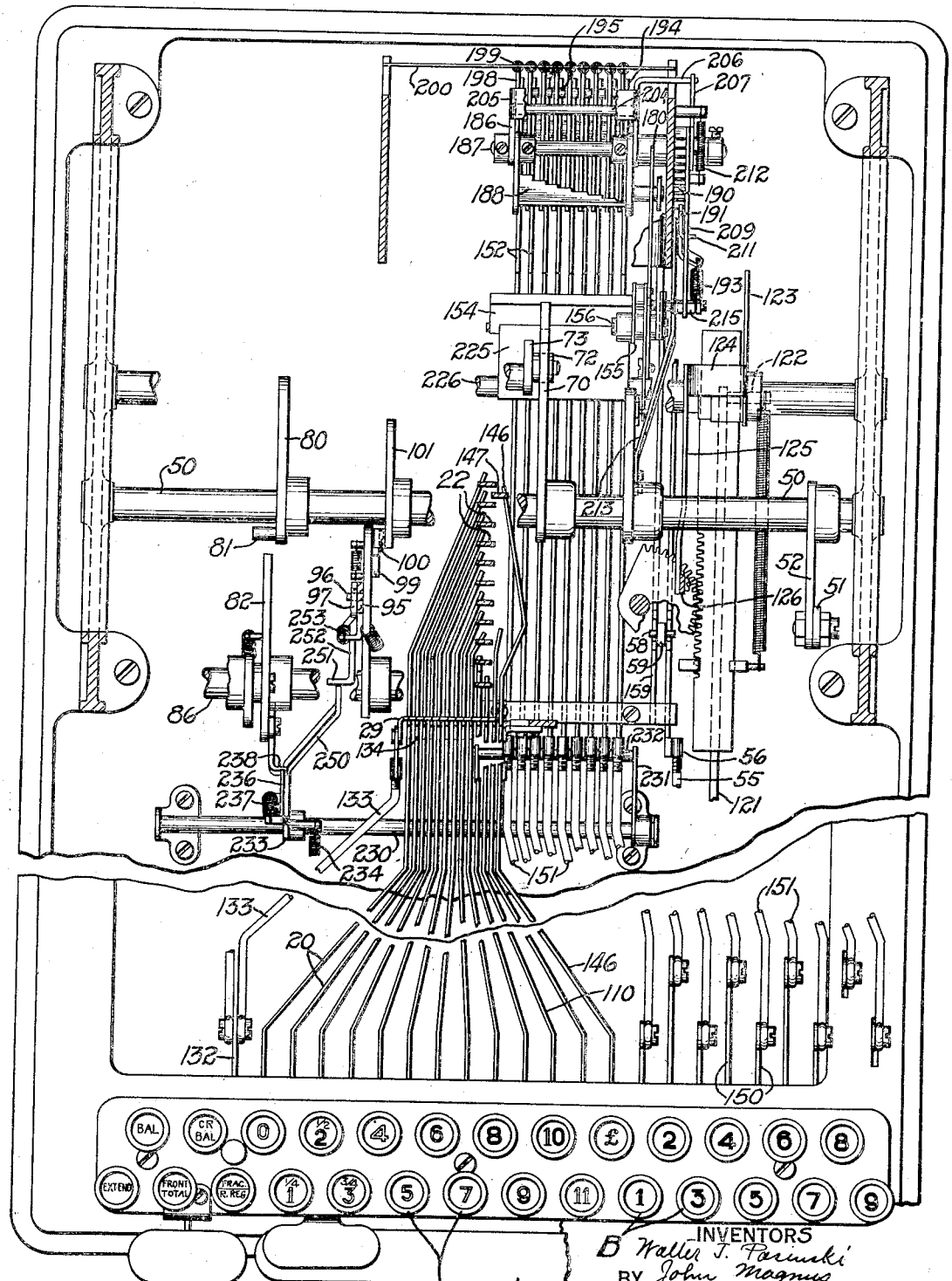
Fig. 2 is a fore-shortened irregular sectional plan view substantially on the line 2—2 of Fig. 1.
Figure 3:
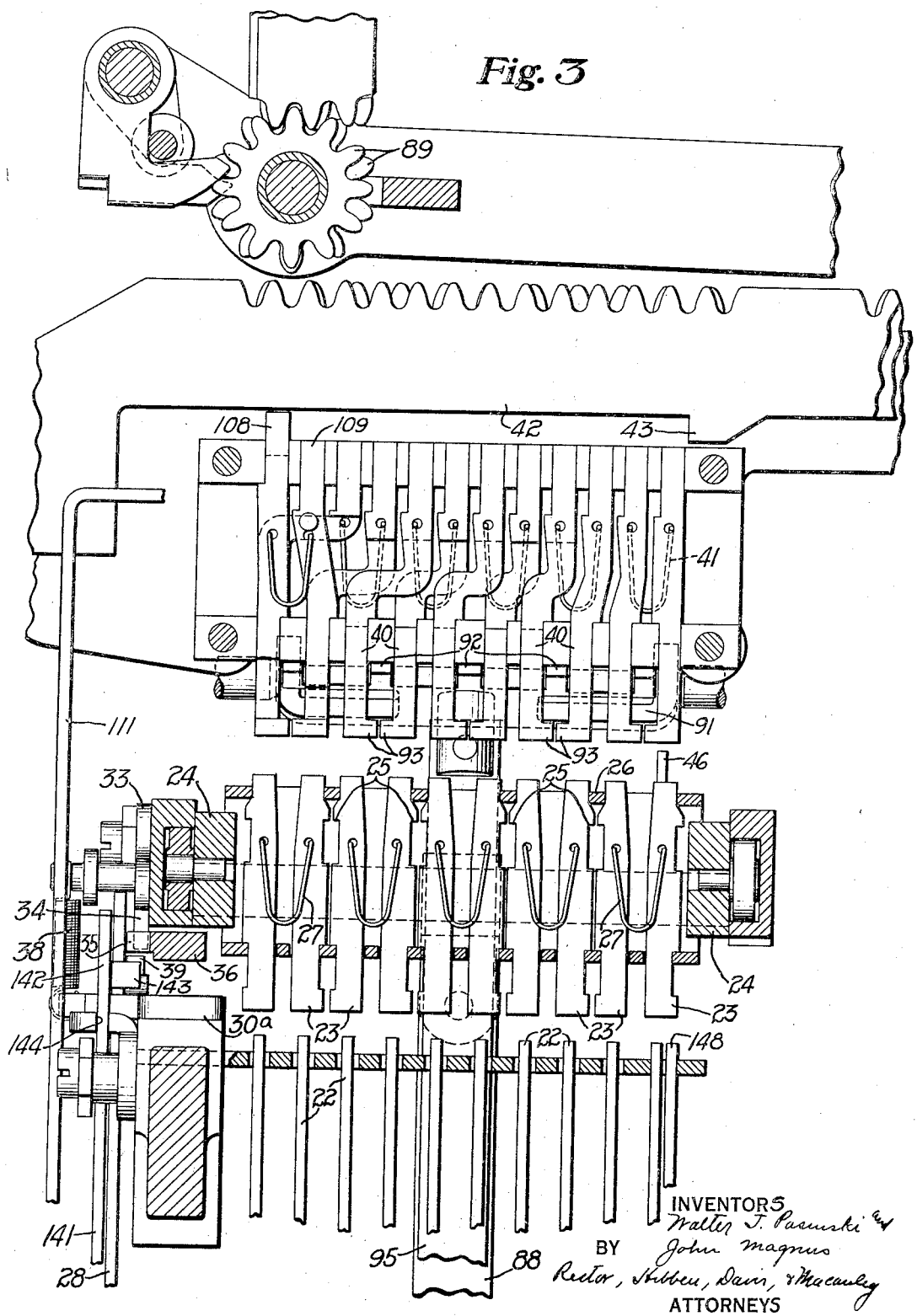
Fig. 3 is an enlarged partial section taken substantially on the line 3—3 of Fig. 8 between the farthings and pence rack bars.

The keyboard, which is arranged for the English sterling system and is illustrated in Fig. 2, has eleven amount keys A, numbered from 1 to 11 inclusive. Each key is connected to its own rock lever 20, one of which is illustrated in Fig. 1. These levers are pivoted at 21 and all except the "11" key lever have their rear ends engaging beneath vertical push rods 22. These push rods are arranged in a row with one rod for each amount key, the arrangement of the series being illustrated in Fig. 2. The upper ends of the push rods are positioned to engage and move pins or setting up devices 23 mounted in a traveling pin carriage 24 shown in detail in Fig. 3 and constituting what will be called an intermediate field of pins or setting up devices. Each pin is mounted to be movable upward from the position illustrated in Fig. 3 to a position such that its shoulder 25 engages over a cross bar 26 on the carriage where it is releasably held by its spring 27, of which there is one for each pair of adjacent pins as shown in Fig. 3. There are ten pins in each row and the carriage is normally in such a position that the first row of pins on the left-hand side of the pin carriage as viewed from the front of the machine is in line with the row of push rods 22. In the machine illustrated this is the "farthings" row of pins.

The pin carriage is normally stepped one step at a time across the machine from right to left at each depression of an amount key, the movement being under the control of an escapement mechanism whose general features are shown in Fig. 4. Reference is also made to Thieme Patent No. 1,143,240.

Referring to Figs. 3 and 4, the escapement mechanism is normally operated by a vertical bar 28 which is widened out near its lower end and has fastened to it a loosely pivoted plate 29 which extends over all the bars 20 associated with the keys "0" to "11" inclusive, the lower portion of said plate being normally positioned slightly above the tops of the bars 20. The lower end of the bar 28 is guided for vertical movement by a plate 30 and its upper end is likewise guided and held against lateral movement by a guide plate 30ª. The bar is urged downward by a spring 31. The upper end of the bar 28 is positioned to engage a stud 32 on a detent arm 33 pivoted to one of the front guide rails in which the intermediate pin carriage 24 travels. The detent 33 has a beveled tooth 34 which engages the teeth 35 of a rack bar 36 securely fastened to the intermediate pin carriage 24 which is urged to the left as viewed in Fig. 4 by a spring 37. The detent 33 is urged clockwise by a spring 38 shown in Fig. 3. The vertical rod 28 has an offset lug 39 at its upper end which is normally beneath the teeth 35 and so positioned that when the bar 28 is projected upward the lug moves between the teeth of the rack. The lug is somewhat thinner than the distance between the teeth so that the rack may have a slight movement relative to it. From the above it will be evident that, when a numeral key A is depressed, the counterclockwise movement of its lever 20 will lift the bar 28 upwardly against the tension of its spring 31. As the bar moves upwardly, its lug 39 moves between two of the teeth 35 of the rack 36 and its upper end engages the stud 32 to lift the detent 33 to disengage its tooth 34 from the rack 36. When this disengagement occurs, the tension of spring 37 moves the pin carriage to the left as viewed in Fig. 4, against the lug 39, the movement being sufficient to prevent the detent 33 from returning to its original position. When the amount key is released, the bar 28 moves downwardly and its lug 39 moves from between the teeth 35 of rack 36. The pin carriage then moves slightly to the left under the influence of its spring, such movement being limited however by the engagement of the tooth 34 of detent 33 with the next tooth of the rack 36. It will be noted that the back sides of the teeth 35 are beveled so as to permit the tooth 34 to move down between them. The bevel of the teeth and of the detent 33 is such as to permit the detent 33 to be cammed free of the rack teeth 35 when the carriage is being restored to its normal righthand position.

With the pin carriage in its normal position, if the "8" key is the first amount key depressed, the "8" pin in the first row of pins in the intermediate pin carriage will be elevated and it will be releasably held in this position, after which the carriage will move over a step to the left to present the second row of pins in line with the push rods 22. If the second key depressed is the "5" key, then the "5" pin in the second row of pins of the intermediate pin carriage will be elevated, and so on until the item to be entered in the machine has been set up in the intermediate pin carriage. The machine is then given a stroke of operation which elevates the intermediate pin carriage and causes its elevated pins to contact with corresponding pins in a stationary field of pin stops 40 (Fig. 3) to elevate the latter collectively so that they will rise and be held by the springs 41 in position to differentially limit the movement of actuator racks 42 which have projections 43 on them for engaging the stops. As the actuator racks are positioned they also position type bars 44 (Fig. 1) and a suitable printing mechanism, described in the aforementioned Hopkins patent, causes the hammers 45 to strike the type at the proper moment to record the item entered in the machine.

In order to prevent the rack bars 42 from moving forward in all banks to the left of that in which a numeral key had been depressed, a zero stop plate 46 (Fig. 7) is provided which is suitably secured to the intermediate pin carriage in alignment with the rearmost or "0" row of stops. This plate extends in advance of said "0" stops so that in the normal position of the carriage, the zero stop plate 46 is directly beneath the "0" pin of the pence order of the stationary field of stops 41 and projects to the left of and beneath all the "0" stops of the stationary field, as clearly shown in Figs. 3 and 7, Fig. 7 being a view from the rear. When the intermediate pin carriage is raised under these conditions, the plate 46 raises all the "0" stop pins in the stationary field except the one in the first or farthings row. As the carriage is stepped to the left, which is to the right as viewed in Fig. 7, the plate 46 moves with it but it will be obvious that, at whatever lateral position the carriage occupies when it is raised, the plate 46 will raise all the "0" stops 40 in the stationary field 41 which are located to the left of the position occupied by the first or left-hand row of stops of pins in the intermediate pin carriage. This will have the effect of projecting "0" stops 40 into the paths of the rack bars to the left of the last bank in which a numeral key has been depresed, thereby blocking the rack bars in their "0" position in such banks where the zero plate 46 has been effective. If these rack bars were not stopped in their "0" position, they would move forward when the machine was operated and would add "9" in every bank where the rack bar had not been stopped, thereby registering an incorrect result. The reason for starting the zero stop plate 46 beneath the "pence" instead of the "farthings" bank will be described later.

The machine illustrated is motor-driven and the main drive shaft 50 (Figs. 1, 2, 12 to 15) is rocked by a motor operated link 51 connected to an arm 52 fixed to shaft 50. When the motor driving connections are set to cause the motor to operate the machine, the motor pulls the link 51 down a limited distance and then returns it. The machine is set into operation by depressing a motor bar 53 (Figs. 2 and 13) which rocks a bell crank 54 to pull forward on a rod 55 that, in turn, pulls forward a sliding bar 56 (Fig. 12) having a cam projection 57 which engages a stud 58 on a link 59 for controlling the driving connections between the motor and the machine. When the motor bar 53 is depressed, the sliding bar 56 is moved forward which raises link 59 and causes the motor to give the machine a stroke of operation. As the slide bar 56 moves forward it tensions a spring 60 (Fig. 12) connected at one end to the bar and at its other end to a frame stud, with the result that the spring urges the bar rearward to stop operation of the machine. It is prevented from moving rearwardly immediately, however, by a latch finger 61 which is urged by a spring 62 in a counterclockwise direction so that it will move behind a projection 63 on bar 56 when the bar is moved forward. The bar is thus temporarily latched in its forward position, but it is released during the return stroke of operation of the machine by an arm 64 carrying a lug 65 that operates a pivoted pass-by pawl 66. This pass-by pawl is urged counterclockwise by a spring 67 to cause a stud 68 on the pawl to engage the latch finger 61, but the spring 67 is so much weaker than the spring 62 that the pawl normally has no effect on the latch. During the forward or counterclockwise stroke of the main operating shaft 50, the lug 65 on arm 64 passes the pawl 66 which yields freely but, upon the return stroke, the lug 65 catches pawl 66 and rocks it counterclockwise to cause its stud 68 to raise the latch 61 to free the bar 56 which, under the influence of spring 60, returns rearward to permit link 59 to move down to disconnect the motor from the driving connections with the result that the machine is stopped after having been given one stroke of operation.

The actuator racks are controlled by the main drive shaft 50 through a cam 70 having a cam slot 71 in which operates the cam roller 72, carried by one of a pair of arms 73 supporting a restoring bail 74 extending across the machine in front of a series of arms 75, there being one arm for each actuator rack connected to it by a pin and slot connection as shown in Fig. 1. The arms 75 are urged forward by springs 76, but they are normally restrained against forward movement by the bail 74. During the initial part of the forward stroke of the machine the cam 70 is rocked counterclockwise and the cam slot 71, acting on the cam roller 72, swings the arms 73 forward to move the bail 74 forward to release the arms 75 which then move forward under the influence of their springs 76 until limited by the engagement of the projections 43 on the actuator racks with the stop pins 40 that have been projected upward by the entry of an amount in the machine. During the return stroke of the machine the bail 74 picks up all the arms 75 and restores them to normal position. It will be observed that the first part of the cam slot 71 has a dwell in it so that the bail 74 will not be moved forward immediately. This is for the purpose of insuring that the intermediate pin carriage shall have time enough to be elevated to elevate the stationary stop pins 40 prior to the release of the actuator racks 42.

The intermediate pin carriage is elevated at the beginning of the forward stroke of the machine by means of a cam plate 80 (Fig. 12) carrying a stud 81 which engages the end of a pawl 82 pivoted on an arm 83 and normally held in the position shown in Fig. 12 by a spring 84 which urges a projection on the pawl into engagement with a limit stud 85 on arm 83. The arm 83 is fixed to a shaft 86 and a second arm 87 fixed to this shaft is connected to a link 88 which, in turn, is connected to the intermediate pin carriage. When the stud 81 engages the pawl 82 the shaft 86 is rocked counterclockwise to elevate the link 88 to thereby elevate the pin carriage.

Cooperating with the actuator racks 42 as shown in Fig. 1 are front and rear counters or registers 89 and 90 which may be selectively engaged with the actuator racks at the proper time to add, subtract, take a total or sub-total, etc. under the control of mechanism not illustrated herein, but described in detail in Hopkins Patent No. 1,336,904, to which reference is made. In the normal operation of the present machine, the rear counter 90 is rocked into engagement with the actuator racks after they have been differentially positioned against the stop pins 40. The return movement of the actuator racks by the restoring bail 74 then rotates the counter pinions to register the item in the counter which is afterwards rocked out of engagement with the actuator racks prior to the next forward movement of said racks.

The pin stops in the stationary field are returned to normal by means of a comb plate 91 (Figs. 3, 8 and 9) having teeth 92 extending between the rows of pin stops 40 near their lower ends and in position to engage their off-set lower ends 93 shown in Fig. 3. The comb plate 91 is urged upward by a spring 94 (Fig. 9), but it may be pulled downward to restore the pins by means of a link 95 (Figs. 9 and 12). The link 95 is provided with a stud 96 (Fig. 12) over which the hooked nose of a latch 97 projects. The latch is pivoted on an arm 98 which turns loosely on the shaft 86. The outer end of this arm carries a pass-by pawl 99, adapted to be engaged by roller 100 on a cam plate 101 fixed to the main drive shaft 50. During the forward stroke of the machine the roller 100 passes the pass-by pawl without moving the arm 98, but near the end of the return stroke the roller engages the pass-by pawl and rocks the arm 98 slightly clockwise to pull down on the link 95 to pull the comb plate 91 down to restore the stop pins 40 to normal. The link 95 is slotted at 102 to prevent it from being pulled downward by the stud 103 when the arm 98 moves clockwise with the latch 97 released, the purpose of which construction will be explained later.

The projected pins in the intermediate carriage are restored to normal during the return of the carriage across the machine from left to right, such restoration being effected by a wiper plate 104 (Fig. 1) which has cam surfaces for moving the pins laterally to disengage their shoulders 25 and for forcing them downwardly. For a more detailed disclosure of this restoring means reference is made to Hopkins Patent No. 1,336,904, particularly Figs. 37 to 40 thereof.

From the above description, it will be clear that, normally, when the amount keys are depressed, certain pin stops are set up in the intermediate carriage which carriage tabulates to the left for each depression of an amount key. When the motor bar is depressed, the machine is given a stroke of operation and then automatically stopped. During this operation, the intermediate carriage is raised to project upward a corresponding series of pins in a stationary field of stops, which latter pins act as stops for the actuator racks that are released. Positioning of the actuator racks also positions the type bars and at the appropriate time the printing mechanism strikes the type to print the amount. After the bars have been positioned, one or both of the counters are rocked into engagement with them after which they are restored to normal to register the amount in the counter. During this restoring movement, both sets of pins are ordinarily restored to normal to be ready for another operation. The above features have been described generally in order that the invention, which involves certain changes in some of them, may be clearly understood.

English sterling features

The Burroughs Moon-Hopkins machine is normally built to operate with a decimal system of calculation, that is, there are ten stop pins in each row of pins in both the intermediate and the stationary fields of stops. It often happens, however, that there is use for a machine where all the calculations are not under a decimal system, as, for example, the English sterling system of currency. In the latter, the decimal calculations are used for everything over a pound, but for calculations in amounts less than a pound, the units are on the basis that four farthings make a penny, twelve pence make a shilling and twenty shillings make one pound. This would ordinarily require a shillings rack bar with twenty teeth and a counter pinion with a like number of teeth, a pence rack bar and counter pinion with twelve teeth each, and a farthings rack bar and pinion with four teeth. The variations in the pitch of the teeth in these different rack bars and pinions introduce obstacles which must be overcome for successful commercial operation.

Sterling actuator racks

In the present invention, this is done by providing a farthings rack bar having twelve teeth, a pence rack bar having twelve teeth and two shillings rack bars having ten teeth each. In this way, all the rack bars are decimal bars except the pence and farthing bars which have twelve teeth each, but this is so close to ten that satisfactory operation may be obtained.

The farthings bar with its twelve teeth has three times as many teeth as are needed because there are only four farthings in a penny. The farthings counter pinion has twelve teeth also. However, the farthings counter pinion is provided with a transfer projection for every four teeth so that every time it moves a distance corresponding to four teeth, a transfer of one ("1") occurs to the pence pinion. There are only three stops in the farthings row of stationary stops 40 as illustrated in Fig. 5 and hence the farthings rack bar when released, moves forward only one, two, or three steps, it not being necessary to record a higher number of farthings than three.

The pence rack bar with its twelve teeth cooperates with a counter pinion having a like number of teeth, said pinion having a single transfer projection so that when turned from its "11" to or through its "12" position it will transfer one unit to the shillings counter pinion. There are twelve stop pins in the pence row of stationary stops.

The two shillings rack bars with their ten teeth each constitute a units of shillings bar and a tens of shillings bar. Each bar has a counter pinion with ten teeth and each pinion has the usual transfer projection. There are ten stop pins in each row of shillings stops in the stationary field of stops.

Differential stops

It will be apparent that if the field of stops cooperating with the racks were tabulated relative to the racks and if this field of stops had different numbers of stops in different rows, inaccuracies would result because the different rows would not always be positioned under rack bars constructed to move distances corresponding to the number of stops in the rows under them. In the present invention, however, the number of stops in the rows of stops cooperating with the racks may be changed because this field of stops is stationary, that is, it does not move laterally relative to the racks. Thus, the farthings row of stops in the stationary field always cooperates with the farthings rack bar, the pence row with the pence bar, the shillings row with the shillings bar, etc.

As previously explained, selected pins in the stationary field of stops are collectively projected by the raising of the intermediate pin carriage bodily after it has tabulated across the machine. The rows of stop pins in the stationary field vary in number in the different orders. If the number of pins in the different rows in the intermediate pin carriage differed in the same way, confusion would result from the fact that the rows of pins in the carriage would not always be under rows of stops in the stationary field having the same number of pins. If the tabulated carriage acted directly as a positioning means for the actuator racks, this difficulty would require a complete reorganization of the machine, in fact, a new machine. In the present machine the use of a stationary field of stops for positioning the actuator racks places the correct row of stop pins under each rack and it is then possible by an arrangement hereinafter explained to use a traveling pin carriage for projecting the stop pins, which carriage has the same number of pins in each row, that is, it may be the same as the carriage in the decimal system machine having ten pins in each row. In order that the ten pins in each row of the intermediate carriage may operate the three stops in the farthings row of stationary stops and the twelve stops in the pence row of stationary stops, the bottoms of the stop pins in these rows are offset from their tops as illustrated in Figs. 3, 5 and 6.

The three farthings stationary stops 40 are offset only slightly because these stops are already almost in line with the stop pins of each of the rows in the intermediate carriage, but they are offset enough at the points 105 to make their lower ends line up for operation by the second, third, and fourth decimal stops of the intermediate carriage.

The pence stationary stops 40 must be progressively offset as illustrated in Fig. 6 with the last one offset at 106 to a very considerable extent. In fact, the offset of the last few stops is such that the adjacent stops must be cut away at 107 to accommodate the movement of one relative to the other. In this manner, the bottoms of the first ten stationary stops of the pence row are spaced the same as for decimal work while their tops are spaced on the basis of twelve stops occupying the space normally occupied by ten decimal stops. The traveling pin carriage may thus operate the first ten stops of the stationary field in the pence order, "0" to "9" inclusive, but this leaves two additional ones to be controlled, to-wit, the "10" and the "11" stops. These two additional stops comprise the permanently projected "11" stop 108 (Fig. 3) and an independent "10" stop 109 which is individually actuated independently of the traveling pin carriage. In other words, the traveling pin carriage controls ten stops "0" to "9" inclusive in the stationary field in the pence order the same as it does in the other orders (except farthings) and the two additional pence stops in the stationary field are independent of the carriage, one, the "11" stop, being permanently projected and the other, the "10" stop, being projected by a special "10" key (Fig. 2) direct from the keyboard.

The permanently projected "11" stop 108 may be permanently projected because there are no stops beyond it. Should any stops be projected in front of it, that is, any of the stops from "0" to "10" inclusive, these stops would intercept the pence rack bar and the fact that the "11" is permanently projected would not interfere with their operation. On the other hand, if none of the stops from "0" to "10" inclusive is projected, the pence rack bar, if released, moves to the limit of its movement or against the stop "108" to register eleven pence. An "11" key is provided on the keyboard as shown in Fig. 2, but this key merely operates the usual escapement mechanism to tabulate the pin carriage and does not act to project any of the stop pins.

The "10" pin stop 109 in the pence order is projected into position by means of a "10" key on the keyboard. This is an additional key which operates the usual form of lever 110 (Fig. 10) engaging the lower end of an irregular shaped push rod 111 guided in the plate 30 and normally held downwardly by the spring 112. The upper end of the push rod has an offset extension 113 engaging under a pin 114 projecting from the "10" pin stop in the pence order. Whenever the "10" key is depressed, the push rod 111 is elevated which results in pushing upward on the pin 114 and raising the "10" pin stop.

The first ten stops 40 in the pence order are restored to normal by the comb plate 91 which is the common restoring element for the pins in the stationary field as has already been explained, but special provision must be made to enable the comb plate to restore the "10" pin stop.

Referring to Fig. 9, the end of the tooth 92 of the comb plate 91 adjacent the "10" pence key projects through an opening in the lower end of a slide plate 115 mounted to slide on a stud 116. The upper end of the slide plate has a slot 117 through which the pin 114 on the "10" pence pin projects. The slot 117 is sufficiently long to allow the "10" pin 109 to move freely to its elevated position, but when the pin 109 is raised and the slide plate 115 is drawn downward by the downward movement of the comb plate 91, the top edge of the slot 117 will contact with the stud 114 to pull the stop pin 109 down to normal. The "10" pin in the pence order is thus restored along with the "0" to "9" pins.

If an error has been made in depressing the "10" pence key, it may be corrected by manipulating the usual error key on the machine. This key, which is designated herein as 120 in Fig. 10, is connected to a slide plate 121 which moves rearward when the key is pressed. The rear end of this plate carries a stud 122 that contacts with the arm 123 of a yoke-shaped member 124 whose other arm 125 is connected to an irregular shaped link 126 that, in turn, is connected to an arm 127 pivoted to a machine stud 128. The arm 127 is urged upwardly by a spring 129 against a shoulder on a limit plate 130. When the error key is pressed inward, the arm 127 is moved downward and a laterally projecting lug on its free end engages the pin 114 on the "10" pence pin to move the raised pin down to normal.

*Tabulation of intermediate pin carriage*

As previously explained, the intermediate pin carriage is tabulated from right to left at each depression of an amount key. Certain special controls for this tabulating mechanism are introduced for convenience in the sterling system of currency. In order that these may be understood clearly, the positions of the pin carriage when entering certain items will be explained.

When in normal position, the first row of pins, that is, the left-hand row, is under the farthings row of stationary stops. If an amount key is depressed, the carriage tabulates over a step and, if only a farthings item were to be entered, it would appear as pence which would be incorrect. As a matter of fact, the farthings rack bar is normally prevented from moving and a special key must be depressed when it is desired to enter farthings. Generally speaking, farthings are disregarded but, if it is desired to include them, the special key marked "Frac." in Fig. 2 is depressed. This key corresponds to the decimal key in the Hopkins Patent No. 1,336,904, and it controls mechanism like that described in said patent. Depression of the key releases the mechanism that normally blocks the farthings rack bar, said mechanism being the same as that for the decimal bar in the Hopkins patent, so that said rack bar is released for operation. Depression of the "Frac." key also disables the escapement mechanism. The lever 132 operated by this key has a rod 133 connected to it (Fig. 2) which is also connected to the lower end of the pivoted plate 29 as shown in Fig. 4. When the "Frac." key is depressed the plate 29 is swung forward to position its lower edge over the cut out portions 134 in the key levers 20. The "Frac." key remains depressed until one of the amount keys is depressed. Under these conditions the raising of the lever 20 of the amount key through depression of said key does not raise the plate 29 and bar 28 to operate the escapement mechanism.

Accordingly if it is desired to enter a farthings item, the special "Frac." key is depressed and then one of the keys marked "¼", "½", or "¾" is depressed to set up the "1", "2", or "3" farthings pin in the intermediate pin carriage. Inasmuch as the escapement mechanism was disabled by depression of the "Frac." key, the pin carriage remains in its normal position with its first row of pins under the farthings row of stops in the stationary field and, when the machine is operated, the projected pin in the intermediate carriage projects the corresponding pin in the stationary field. Since the farthings rack bar has been released, it may move forward to index the farthings item.

When a pence item is entered, it is merely necessary to depress the amount key for the number of pence to be entered, that is, any of the keys A from "0" to "11" inclusive. Depression of one of these keys sets up a pin in the first row of pins in the intermediate carriage and tabulates the carriage one step to the left so that said first row is under the pence row of stops in the stationary field. Should the "10" key be depressed, it acts independently to set up the "10" stop and it also tabulates the carriage. Should the "11" key be depressed, no stop is set up as the permanently projected stop heretofore described comes into play, but the carriage is tabulated a step the same as when the other keys are depressed. In other words, when pence are to be entered, the machine operates in a normal manner by simply depressing the appropriate amount keys.

When both pence and a farthings items are to be entered the operation is a combination of the two operations heretofore described. The pence item is entered by depression of the desired amount key and the farthings item is entered by first depressing the "Frac." key and then depressing the appropriate one of the three fractional keys "¼", "½" or "¾".

When a shillings item is to be entered alone the appropriate amount key is depressed and then the "0" key is depressed to tabulate the carriage to proper position. For example, if nine shillings is to be entered, the "9" key is depressed. This projects the "9" pin in the first row of pins in the intermediate pin carriage and steps the carriage over one step which would place the first row of pins under the pence row of stops in the stationary field. If the machine were then operated, the item would be incorrectly registered as pence. To avoid this, the operator depresses the "0" amount key, meaning that there are no pence to be registered, and this tabulates the pin carriage over another step to place the first row of pins under the first row of shillings stops in the stationary field. The carriage is then in proper position for operation of the machine. If the shillings item is one between 10 and 19 inclusive depression of two amount keys plus depression of the "0" key is required which, as will be readily understood, will tabulate the pin carriage to place the first two rows of pins under the two rows of shillings stops in the stationary field. If shillings and pence are to be entered, it is not necessary, of course, to depress the "0" key because the entry of the pence item tabulates the carriage to proper position. If farthings are also entered the special "Frac." key must be used as previously explained.

When pounds sterling are entered along with shillings, or with shillings and pence, or with shillings, pence and farthings, the operations are simply a combination of the operations described but, if it is desired to enter pounds alone, it is not convenient to tabulate the carriage by successive depressions of the "0" key since it would require three depressions of such key; one to tabulate the pin carriage to move the first row of pins from under the farthings row of stops in the stationary field to the pence row, one to place said first row under the first row of shillings stops, and another to place the said first row under the second row of shillings stops. To avoid this a special pounds keys is employed which is shown in Fig. 2 where it is marked "£".

The special pounds key, when depressed, operates a lever 140 (Fig. 4) similar to the levers 20 of the regular amount keys. It will be noted, however, that the lever 140 is not positioned under the plate 29 which is raised by depression of the regular amount keys to operate the tabulating mechanism for the pin carriage. Instead, it is entirely free of said plate and is connected to a special bar 141 that projects upwardly and is arranged for cooperation with the rack 36. The upper end of bar 141 has a laterally projecting arm 142 positioned to engage the stud 32 on the detent 33 when the bar is raised. The bar also has a lug 143 positioned to move between the teeth of the rack 36 the same as the lug 39 on the regular escapement mechanism. When the pounds key is depressed the bar 141 is raised, the detent 33 is disengaged from rack 36, and the lug 143 moves between two of the teeth 35 of the rack, said lug being thin enough to allow a short movement of the rack. In other words, the action is the same as that of the escapement mechanism heretofore described. However, instead of the bar 141 being held against lateral movement by the guide plate 30ᵃ as is the bar 28, it operates in a slot 144. The bar is normally held against the right hand end of this slot by a spring 145 but this spring is much weaker than the pin carriage spring and, when the bar is connected to the rack 36 by the lug 143, the carriage moves over to the left until the bar 141 strikes the left hand end of the slot 144. This slot is of such a length that the carriage moves over two additional spaces or a total of three spaces. Consequently, when the special pounds key is depressed, the pin carriage automatically tabulates three spaces to the left. During this movement the pin 32 on detent 33 rides on top of the arm 142. Upon release of the key, the detent 33 moves down to catch the rack 36 in the same manner as heretofore described. The usual procedure in entering pounds items alone is to first depress the amount key or keys for the number of pounds and then depress the pounds key to tabulate the pin carriage to the proper position.

The pounds keys operates a lever similar to the levers 20 for the usual amount keys but this lever 146 is irregular in shape as shown in Fig. 2 and it operates a special push bar 147 (Fig. 2) which is offset from the other push bars. The upper end of this bar is widened out at 148 as shown in Fig. 7 and it is positioned so that, when elevated, it will elevate three zero stop pins in the intermediate pin carriage. In this manner the zero pins for the pence, the units and the tens of shillings are elevated to cause ciphers to be printed in these orders.

*Multiplying mechanism*

The machine is equipped to multiply by a process of repeated addition, such multiplication being under the control of a series of multiplication keys B located at the right of the amount keys as illustrated in Fig. 2. These keys control a step by step mechanism that operates to give the machine a number of strokes corresponding to the value of the multiplier key depressed so that, after an item has been entered on the amount keys, and when one of the multiplier keys is depressed, the item will be added in the machine a number of times corresponding to the value of the multiplier key, such action taking place automatically and the machine being stopped automatically.

Each of the multiplier keys operates a bell crank 150 (Fig. 13) which, when the key is depressed, draws forwardly on the rod 151 (Fig. 11) connected to a sliding plate 152, there being a rod 151 and sliding plate 152 for each multiplier key. Each of the sliding plates 152 has an upstanding projection 153, provided with a forwardly extending nose engaging a pivoted universal cross plate 154 (Figs. 11 and 12) that is rocked forward whenever one of the multiplier keys is depressed. The upper edge of this plate (Fig. 12) is pivoted to an arm of a bell crank lever 155 pivoted at 156 to a frame bracket. Extending outwardly from the upper edge of the plate 154, as illustrated in Fig. 11, is a stud 157 positioned in a slot in a projection 158 on a slide plate 159 which is provided near its forward end with a cam projection 160 for engaging the stud 58 on the motor controlling bar 59.

The machine is started when any one of the multiplier keys is depressed through the forward movement of the corresponding slide plate 152 which rocks the universal plate 154 forward resulting in forward movement of the stud 157 and slide plate 159 which raises the motor bar 59 to cause the motor to operate the machine.

The machine is stopped by a reverse movement of the slide bar 159 which allows the vertical bar 59 to move down, and, for this purpose, the bell crank lever 155 connected to the universal plate 154, is connected to one end of a link 161 whose upper end has a shoulder 162 adapted to be engaged by a stud 163 on an arm 164 fixed to the main drive shaft 50. The parts are proportioned so that when none of the multiplier keys is depressed the shoulder 162 is above the path of travel of the stud 163, as illustrated by the dot and dash position of the arm 164 in Fig. 12. When one of the multiplier keys is depressed the bell crank lever 155 is rocked clockwise to the Fig. 14 position which draws the link 161 downward. This would position its shoulder 162 to be acted upon by the stud 163 were it not for the fact that the link 161 is simultaneously drawn rearward out of the path of the stud by a mechanism that will be later described. It should be noted, however, that when the link 161 has been moved downward and, if it is allowed to remain forward in the Fig. 12 position, the stud 163 will engage the shoulder 162 at the end of the forward stroke of the machine and rock the bell crank lever 155 counterclockwise which will draw the slide plate 159 rearward to remove the raised portion 160 from under the stud 58 thereby allowing the motor bar 59 to move down to stop the machine.

After one of the multiplier keys has been depressed and the machine started, it is desirable to lock the key in depressed position until the multiplying operation has been completed. This is accomplished by means of a locking plate 165 (Fig. 12) which is universal to all the keys except the "1" key and which moves down into engagement with notches 166 in the rear ends of the multiplier key slide plates 152 of all keys except the "1" key. Each plate has two notches either of which may be positioned for engagement by the locking plate 165. When one of the slides 152 is moved forward by depression of its key, the locking plate engages the rear notch in said slide plate and the forward notches in the other slide plates, to prevent restoration of the moved plate, depression of the other multiplier keys being prevented by interlocking devices at the front of the machine which need not be described. The locking plate 165 is fixed to a shaft 167 having an arm 168 connected to a link 169 that is urged downwardly by a spring 170 connected at one end to a projection on the link and at its other end to a suitable bracket on a stationary frame plate. The spring thus urges the locking plate toward locking position but said plate is normally prevented from so moving by a stud 171 which engages the end of a slot 172 in the upper end of the link 169. The stud 171 is lowered by depression of any one of the multiplier keys in a manner that will be later described which permits the spring 170 to move the locking plate to locking position. This has the effect of locking the moved slide plate 152 in its forward position to hold the motor bar 59 elevated to cause the machine to continue to operate until the parts are unlocked. In other words, the machine is locked in condition for repeated operations until some mechanism operates to unlock it, such unlocking being accomplished by a raising movement of stud 171 which raises link 169 to raise the locking plate 165.

The stud 171 not only controls the unlocking of the machine but it also controls the stopping of it through control of the link 161. Resting against the stud 171, as shown in Fig. 12, is one arm 180 of a bell crank lever pivoted at 181 and having another arm 182 carrying a stud 183 operating in a slot 184 in the link 161, the pin and slot connection being for the purpose of permitting the link 161 to have a longitudinal movement relative to the bell crank lever. The bell crank lever is urged clockwise by a spring 185 so that when the stud 171 is lowered, the bell crank lever is rocked clockwise to swing the link 161 clockwise or rearward to move its shoulder 162 out of the path of the stud 163 on the arm 164. The clockwise movement of the bell crank lever 180—182 is limited by the engagement of the arm 180 with a collar on an adjacent shaft as illustrated in Fig. 14.

From the description thus far given it will be clear that, when one of the multiplier keys is depressed, its slide plate 152 is moved forward and the motor bar 59 is raised to cause the motor to give the machine a stroke of operation. At the same time the link 161 is moved downward so as to be in a position to stop the machine but, on account of the fact that the stud 171 is lowered simultaneously the link 161 is rocked rearward out of position to stop the machine. The lowering of the stud 171 also permits the locking plate 165 to be moved down to lock the depressed multiplier key against manipulation until the desired number of operations has taken place.

The stud 171 is carried by an arm 186 (Fig. 11) of a yoke shaped member both of whose arms are fixed to a shaft 187. The member 188 of this yoke is in the form of a plate having eight steps in its bottom edge. The yoke is urged counterclockwise in a direction to lower the controlling stud 171 by a spring 189 but it is normally prevented from so moving by a ratchet plate 190 fixed to the shaft 187 and having a series of nine teeth in its edge with which a locking dog 191 pivoted at 192 cooperates. The dog 191 is urged clockwise by a spring 193 to the position illustrated in Fig. 11 where it blocks counterclockwise movement of the ratchet plate and likewise of the yoke 186—188 with its stud 171. The rear end of each of the multiplier key slide plates 152 is provided with a bifurcated projection 194 engaging over a stud 195 on the downwardly projecting arm 196 of a four-armed lever pivoted on the shaft 197.

There is a four-armed lever for each slide plate except the "1" key slide plate which has only a three-armed lever as will be later explained. The rearwardly projecting arm 198 of each of these levers has a spring 199 connected to it and to a fixed cross bar 200, said springs serving to urge the four-armed levers counterclockwise and, through said levers, urging the sliding bars 152 rearward toward normal. The forwardly projecting arm 201 of each four-armed lever is for the purpose of engaging its respective step, of the stepped plate 188 but, normally, these arms are out of the path of the stepped plate and are only moved into the path of it one at a time when a multiplier key is depressed. The upwardly extending arms 202 of these four-armed levers have cam-shaped rear surfaces 203 for engaging a cross bail 204 carried by the yoke 205 pivoted loosely on the shaft 187. This bail has a lateral projection 206 which engages under one arm 207 of a bell crank lever pivoted loosely on the shaft 187. The other arm 208 of the bell crank lever has connected to it a pivoted release pawl 209 having a shoulder 210 for engaging an offset lug 211 on the locking dog 191 so that, when the bell crank lever is rocked counterclockwise, the pawl will raise the locking dog 191 to the position illustrated in Fig. 14 to free the ratchet plate 190. The release pawl 209 is urged counterclockwise into engagement with the lug 211 by means of a spring 212, best illustrated in Fig. 14.

Cooperating with the ratchet plate 190 is a feed pawl 213 pivoted to the arm 164 fixed to the shaft 50, said pawl normally resting on a stud 214 carried by a frame plate of the machine. The parts are proportioned so that, when the arm 164 is given a counterclockwise stroke of movement, the feed pawl 213 is moved far enough rearward to move the ratchet plate 190 rearward the space of one tooth. Projecting laterally from the feed pawl 213 is a lug 215 to which one end of the spring 193 is connected, the other end of said spring being connected to the locking dog 191. The spring thus serves the double purpose of maintaining the feed pawl 213 in engagement with its supporting stud 214 in a position to feed the ratchet forward, and to urge the dog 191 into engagement with the ratchet teeth.

From the above description it will be clear that the ratchet 190, the stepped plate 188, and the associated parts constitute a step-by-step mechanism which controls the number of times the machine will operate until automatically stopped, such mechanism being under control of the multiplier keys and operating as follows:

*Operation of the multiplying mechanism*

When one of the multiplier keys is depressed, for example the "5" key, its slide bar 152 is pulled forward and the corresponding four-armed lever 196—198—201—202 is rocked clockwise. This positions the front arm 201 of the four-armed lever beneath the "5" step of the stepped plate 188. The clockwise movement of the arm 202 rocks the bail 204 and the yoke 205 counterclockwise, which, through the lateral arm 206 rocks the bell crank lever 207—208 counterclockwise and pushes the release pawl 209 forward to raise the locking dog 191 to free the toothed ratchet plate 190 connected to the shaft 187. This permits the stepped plate 188 to descend under the influence of its spring 189 until the "5" step contacts the top of the arm 201 of the four-armed lever of the "5" key bank. The stepped plate carries the controlling stud 171 down five steps and the downward movement of this stud releases the lock 165 and the bell crank lever 180—182. The spring 170 then moves the locking plate 165 to locking position and the spring 185 rocks the bell crank 180—182 clockwise to move the link 161 so that its shoulder 162 is out of the path of the stud 163 on arm 164. The forward movement of the "5" slide plate also rocks the universal plate 154 forward which, through the medium of stud 157, moves the sliding plate 159 forward to raise the bar 59 to cause the motor to start the machine. When the lock 165 moves to locking position the sliding plate 152 for the "5" key is locked in its forward position which keeps the bar 59 raised so that the motor will continue to operate the machine.

As the machine operates through its first forward stroke the arm 164 is rocked counterclockwise and its stud 163 would contact with the shoulder 162 on the link 161 except for the fact that, when the control stud 171 moves downwardly with the stepped plate, the spring 185 rocks the bell crank lever 180—182 clockwise thereby rocking the link 161 to move its shoulder 162 out of the path of the stud 163. Consequently, the arm 164 does not operate to stop the machine.

The counterclockwise movement of the stepped plate 188 has also moved the ratchet 190 five steps counterclockwise. As the arm 164 rocks counterclockwise during the forward stroke of the machine, the feed pawl 213 is moved rearward and it engages the ratchet 190 to move the latter one tooth rearward in a clockwise direction. As the feed pawl 213 moves rearward its lateral projection 215 engages the tail of the pivoted release pawl 209, as illustrated in Fig. 15, and raises the pawl so as to free its shoulder 210 from the projection 211 on the locking dog 191. This frees the locking dog and it moves back into locking position under the influence of its spring 193. Consequently, when the feed pawl 213 is drawn forwardly again during the return or clockwise stroke of the arm 164, the locking dog 191, being in engagement with the ratchet 190, will hold it in the position to which it has been advanced by the feed pawl, that is, one step in a clockwise direction from its original position. The clockwise movement of the ratchet plate 190 also moves the stepped plate 188 upward or clockwise one step and raises the controlling stud 171 one step or one-fifth of its distance back toward normal in the example taken. The locking plate 165 still retains the slide plate 152 for the "5" key in the position to which it was moved at the start of operations and, since the link 161 has been maintained with its shoulder 162 out of the path of the stud 163, the parts remain in position for the motor to continue to operate the machine.

At each successive operation the feed pawl 213 moves the ratchet 190 one step clockwise and, in each case, the locking dog 191 holds the ratchet to the position to which it has been moved. In this manner the ratchet 190 and the stepped plate 188, together with the controlling stud 171, are returned step by step toward their original positions.

At the beginning of the last stroke of the machine, that is, at the beginning of the fifth stroke in the present example, the feed pawl 213 moves the ratchet 190 back to normal which carries the controlling stud 171 up to normal and, as this stud moves to normal, it raises the link 169 thereby raising the locking plate 165 to free the sliding plate 152 of the "5" key. At the same time, the stud 171 contacts with the arm 180 of the bell crank lever 180—182 and rocks it counterclockwise to position the link 161 so that its shoulder 162 is in the path of the stud 163 on the arm 164. Accordingly, at the end of the forward stroke of the fifth operation, the stud 163 engages the shoulder 162 and raises the link 161 to rock the bell crank lever 155 counterclockwise thereby rocking the plate 154 rearwardly and, through the medium of the stud 157, moving the slide plate 158 rearwardly to permit the control bar 59 to move downwardly to stop operation of the machine by the motor. The rearward movement of the universal plate 154 also carries the slide plate 152 for the "5" multiplier key rearwardly to normal, such movement being assisted by the spring 199 for the four-armed lever corresponding to the "5" key. The parts all return to normal including the pivoted releasing pawl 209 which is pulled rearwardly by the spring 212 to position the shoulder 210 to the rear of the lateral lug 211 on the locking dog 191, such movement being permitted owing to the fact that the yoke 205 has been freed to move back to normal by the forward movement of the arm 202 of the four-armed lever for the "5" multiplier key.

From this it will be seen that, when one of the multiplier keys is depressed, the machine is automatically set into operation and it continues to operate for a number of times corresponding to the value of the multiplier key after which it is automatically stopped. After operation starts, the depressed multiplier key is locked in position against manipulation until the desired operations have taken place. When the machine has operated the proper number of times the key is automatically freed and the machine stops.

When the "1" multiplier key is depressed it is, of course, not necessary for the machine to operate more than once and hence the upper arm 202 of the four-armed lever 196—198—201—202 for the "1" key is cut off at 216 as illustrated in Fig. 11. Also, no forward arm 201 is provided. Consequently, depression of the "1" key does not lower the control stud 171 and no repeat operations take place, the machine merely going through one operation and then automatically stopping.

At each operation of the machine above described the rear counter 90 is rocked into engagement with the actuator racks at the proper time to cause the item that has been set up on the amount keys to be added into the counter, which addition occurs as many times as the machine is given strokes. It is not desirable, however, to print this item every time it is added and, in order to prevent this, a special control of the printing mechanism is provided which becomes operative when the machine is used for multiplying.

*Control of printing while multiplying*

Referring to Fig. 12, the printing mechanism is operated by the cam 80 which has a slot 220 in it in which operates a roller 221 on the end of one arm 222 of a lever whose other arm 223 is connected to a link 224 that serves to release the printing hammers, the details being described in the Hopkins patent referred to. Normally, the cam 80 operates the printing mechanism during each operation of the machine.

Pivotally connected with the universal plate 154 is an arm 225 fixed to a shaft 226 which also carries a bent arm 227. The end of this bent arm is under one arm of a bell crank lever 228 whose other arm 229 is connected to the cam 80 so that when the arm 227 pushes up on the bell crank arm 228, the cam 80 is moved laterally against the tension of a spring, not shown, tending to urge it to normal, out of cooperative relation with the roller 221 on arm 222.

Whenever one of the multiplier keys is depressed the universal plate 154 is rocked counterclockwise as heretofore explained. This rocks the shaft 226 clockwise and moves the arm 227 upward to move the cam 80 to non-operating position. In this manner, whenever one of the multiplier keys is depressed, the printing mechanism is disabled and the repeat operations in multiplying do not result in a repeated printing of the item. As the machine automatically stops at the end of a multiplying operation, the parts move back to normal and the printing mechanism is again enabled.

*Control of stop pins during multiplying*

Inasmuch as, in the normal operation of the machine, the amount keys and the pins of the two fields of stops are restored at the end of each operation of the machine, it is necessary to make some provision to have the stops in the stationary field remain in position to differentially stop the actuator racks during each of the successive operations of the machine because the pins 23 of the intermediate pin carriage are restored as the carriage moves to the right after every machine operation. It is also necessary to prevent the up and down movement of the intermediate pin carriage because this carriage has a zero stop plate 46 heretofore described which would normally engage the zero stops of the stationary field upon the second and succeeding operations of the machine and project them up in the position to prevent any movement of the actuator racks.

In order to secure proper operation of the parts in repeated addition operations, the elevation of the intermediate pin carriage and the restoration of the stationary pin stops is placed under the control of the multiplier keys.

Mounted in front of the machine adjacent the multiplier keys is a shaft 230 illustrated in perspective in Fig. 16 and in side elevation in Fig. 12. Fixed to this shaft are two arms 231 carrying a bail 232 positioned immediately in front of the beveled forward ends 233 of the slide plates 152 which are pulled forward by depression of the multiplier keys. Whenever one of the multiplier keys is depressed, the forward movement of its slide bar 152 rocks the bail 232 downward to rock the shaft 230 clockwise as viewed in Fig. 12. Mounted on the left-hand end of the shaft 230 is a bell crank lever 233 urged in a counterclockwise direction, as viewed in Fig. 12, by a spring 234. Pivoted on the rearwardly projecting arm of this bell crank lever is a bell crank latch 235 having an upwardly extending arm provided with a hooked nose 236. This latch is urged in a clockwise direction, as viewed in Fig. 12, by a spring 237 connected to a lateral lug on the second arm of the bell crank latch, the other end of the spring being connected to a lug on the bell crank lever 233. The latch 235 acts as a pass-by pawl relative to a lateral lug 238 on a link 239 pivoted to the end of the pawl 82. The lower end of link 239 is guided by an arm 240 pivoted at 241 to the machine frame.

Whenever one of the multiplier keys is depresesd the clockwise movement of the shaft 230 rocks the bell crank lever 233 downward slightly against the tension of spring 234 which rocks the latch 235 slightly counterclockwise (Fig. 12) and places the spring 237 under tension.

The intermediate pin carriage is elevated, as previously described, at the beginning of the forward stroke of the machine by the engagement of the stud 81 on the cam plate 80 with the end of the pawl 82 pivoted on the arm 83. The shaft 86 is thereby rocked counterclockwise to elevate the link 88 which thereupon elevates the intermediate pin carriage. This same action takes place at the beginning of the first stroke of the machine in a multiplying operation and the pin carriage is elevated as usual during said first operation. As the pawl 82 is moved forward to rock the arm 83 counterclockwise, the link 239 descends and the nose 236 of the latch 235 hooks over the projection 238 to hold the link down. When the cam plate 80 with its stud 81 returns in a clockwise direction during the return stroke of the machine, the arm 83 returns clockwise to its normal position and the link 88 descends to permit the intermediate pin carriage to descend to normal but, since the link 239 is held down by latch 235, the return movement of the arm 83 causes the pawl 82 to turn on its pivot against the tension of its spring 84 to such a position that its end is out of the path of the stud 81 on the cam plate 80. Accordingly, during the succeeding multiplying strokes of the machine the stud 81 will not engage the pawl 82 and the intermediate pin carriage will not be elevated. During the last stroke of operation of the machine the sliding plate 152 of the multiplying key that has been depressed is released, as previously explained, and it is returned rearward to normal, thereby freeing the bail 232. The spring 234 then rocks the bell crank lever 233 counterclockwise and moves the hooked nose 236 of the latch 235 out of engagement with the lug 238 on the link 239. This permits the pawl 82 to be moved back to normal by the spring 84 where it is again in the path of the stud 81 for the beginning of the next series of operations. In this manner the intermediate pin carriage is elevated during the first stroke of operation of the machine to set up in the stationary field the proper pin stops corresponding to the pins that have been set up in the intermediate carriage but, after this has occurred, the elevating mechanism is disabled and the pin carriage remains in its lower receded position until during the last stroke of the series when the multiplier key is released and the elevating mechanism is again enabled so as to be in condition to elevate the carriage during the first stroke of the next series of operations.

It will be recalled that the pin stops 40 of the stationary field are normally restored at the end of each stroke of the machine by a comb plate 91 that is moved down by a slight downward movement of the link 95 (Fig. 12) caused by the engagement of the roller 100 on plate 101 with the pass-by pawl 99 upon the clockwise or return stroke of the cam plate 101, said roller having passed the pawl 99 upon the counterclockwise or forward stroke of the cam plate. In order to prevent restoration of the pin stops of the stationary field during the successive strokes of the machine that follow the first stroke in a multiplying operation, an extension 250 is provided on the bell crank 233 fixed to the shaft 230 at the forward end of the machine. The upper end of this arm normally engages a lug 251 on the tail 252 of the latch 97 which is pivoted on the arm 98 on stud 103 and which has a hook-shaped end engaging over the stud 96 on the link 95. This latch is urged in a clockwise direction by spring 253 one end of which is connected to the projection 254 on the latch and the other end of which is connected to a projection 255 on the link 95. When one of the multiplier keys is depressed, the clockwise movement of the shaft 230 rocks the arm 250 clockwise (Fig. 12) which rocks the latch 97 counterclockwise to disengage its hooked end from the stud 96. Accordingly, when the roller 100 engages the pass-by pawl 99 upon the return or clockwise movement of the cam plate 101, the arm 98 is moved downwardly a slight distance the same as in a normal operation but, since the pawl 97 carried by the arm is disengaged from the stud 96, the link 95 is not moved downwardly and the comb plate 91 is not moved down to restore the pin stops 40 in the stationary field. During the downward movement of arm 98 the stud 96 moves in slot 102 in link 95. This condition of the parts remains until the last stroke of the multiplying operation when the sliding plate 152 of the depressed multiplier key is returned rearward to normal position. This frees the bail 232 and the shaft 230 is rocked counterclockwise to normal, thereby moving the arm 250 counterclockwise and freeing the latch 97 which is moved back to position by the spring 253 so that its hooked nose again engages over the stud 96. Consequently, during the last part of the last stroke of operation of the machine the link 95 is moved downward to restore the pins in the stationary field, thereby conditioning the pin field for a new operation or series of operations of the machine.

We claim:

1. In a machine of the class described, a farthings row of movable stop pins, a pence row of movable stop pins, two shillings rows of movable stop pins, a pounds row of movable stop pins, a laterally movable field of setting up devices, means for tabulating said movable field laterally step by step to move its first row of stops from under the farthings row of stop pins to a position under the second row of shillings stop pins, and a special key and connections for moving said lateral field in one step from said farthings to said second shillings row.

2. In a machine of the class described, in combination, a laterally movable pin carriage having a plurality of rows of movable pins, amount keys having connection for projecting said pins, a stationary field of movable pin stops, means for bodily raising the laterally movable carriage to cause projected pins in the laterally movable field to project corresponding stops in the stationary field, means carried by the carriage for projecting zero stop pins in the stationary field to the left of the last row indexed by operation of the machine, escapement mechanism operated by the amount keys for tabulating the carriage laterally one step at a time, and a special key for operating said escapement mechanism to tabulate the carriage three steps at a time, said latter mechanism including connections for projecting three zero stop pins in the stationary field corresponding to the three steps that the carriage has been tabulated.

3. In a calculating machine of the ten key type, a plurality of actuator racks, a stationary field of stops for arresting said racks in differential positions, said field of stops comprising a plurality of equal length rows of stop pins with ten pins in certain rows, twelve pins in one row and three pins in another, amount keys, and means controlled by said amount keys adapted to successively cooperate with each of said rows to selectively position the pins in each of said rows to arrest said actuator racks.

4. In combination, in a machine of the class described having a laterally movable field of setting-up devices comprising rows of pins with the same number of pins in each row, means for selectively setting up said devices, and means for tabulating said field of setting-up devices laterally step by step; a stationary field of stops comprising a plurality of rows of movable stop pins with the number of pins in some rows differing from that in others, means for moving the field of setting-up devices bodily into engagement with the stationary field of stops to collectively position certain of said stops, and means for selectively positioning the stops in any row of said stationary field of stops in excess of the number corresponding to the number of setting-up devices in each row of said devices.

5. In a combination, in a machine of the class described having a plurality of actuator racks, a laterally movable field of setting-up devices having rows of pins with the same number of pins in each row, amount keys and connections for projecting said pins including mechanism for tabulating the field of setting-up devices laterally as the amount keys are depressed, and means for moving the field of setting-up devices bodily into engagement with a stationary field of stops; a stationary field of movable stops adapted to differentially position said actuator racks, the upper ends of each row of stops in said field being of the same length but some of said rows having a different number of stops than others, the lower ends of the rows of stops in the stationary field being spaced so that the stops in each row up to the number corresponding to the number of setting-up devices per row are settable by any row of the movable field of setting-up devices.

6. In combination, in a machine of the class described having a laterally movable field of setting-up devices, comprising rows of pins with the same number of pins in each row, actuator racks, amount keys and connections for projecting said pins, escapement mechanism controlled by said amount keys for tabulating said field of setting-up devices upon depression of an amount key, and means for moving said setting-up devices bodily into engagement with a stationary field of stops; a stationary field of movable stop pins adapted to differentially position said actuator racks, the number of stop pins in some rows differing from that in others, the lower ends of the stop pins in all the rows in said stationary field being spaced to cooperate with each of the rows in said movable field of setting-up devices, said stop pins in certain rows being progressively offset to space their upper ends in proportion to the gradations for the number of pins in said rows.

7. In combination, in a machine of the class described having a laterally movable field of setting-up devices comprising a plurality of rows of pins with ten pins in each row, amount keys and connections for projecting said pins, and means controlled by said amount keys for tabulating said pin field laterally; a stationary field of movable stop pins having ten pins in some rows and twelve pins in another row, the upper ends of the pins in the row having twelve pins being spaced to make a row of the same length as the rows having ten pins, said pins in the row having twelve pins being offset so that the lower ends of ten of the pins in said row are spaced the same distance apart as the lower ends of the rows having ten pins, and a special key and connections for projecting one of the extra pins in the row having twelve pins, the other extra pin being permanently projected.

In testimony whereof, we have subscribed our names.

WALTER J. PASINSKI.
JOHN MAGNUS.